June 26, 1956 A. R. SHAFFER 2,752,447
HYDRAULIC SAFETY SWITCH FOR MOTOR VEHICLES
Filed June 25, 1953

Albert R. Shaffer
INVENTOR.

United States Patent Office 2,752,447
Patented June 26, 1956

2,752,447

HYDRAULIC SAFETY SWITCH FOR MOTOR VEHICLES

Albert R. Shaffer, York, Pa.

Application June 25, 1953, Serial No. 364,141

1 Claim. (Cl. 200—82)

This invention relates in general to hydraulic control switches, and more specifically to a hydraulically actuated circuit breaker.

Due to the fact that an automobile engine must run at a certain speed in order to permit idling thereof, when one's foot is taken off of the accelerator while driving a car the engine has a tendency to pull the car forward. Thus, when in the case of an emergency when one puts his or her foot on the brake for a sudden stop the engine of the vehicle is fighting against the braking action of the same so that it takes a longer time for the vehicle to stop.

It is therefore a primary object of this invention to provide an improved ignition system for a vehicle engine which includes a circuit breaker connected in the ignition wire, such circuit breaker being actuated by an increase in the pressure of brake fluid in the brake lines of such a vehicle whereby when the brakes are suddenly applied at an increased rate the circuit breaker will be actuated to open the circuit in the ignition wire and thereby cut off the ignition to a vehicle so that the same may utilize its compression in order to facilitate the stopping of a vehicle.

Another object of this invention is to provide an improved hydraulic actuated switch which may be conveniently connected in a hydraulic brake line for the actuation thereof in response to an increase in normal working pressure of the hydraulic fluid in the brake line, the switch being adapted to be connected in the ignition circuit of such a vehicle.

Another object of this invention is to provide an improved circuit breaker which is of a relatively simple construction and which may be conveniently and easily installed in existing vehicles with a minimum of effort.

A further object of this invention is to provide an improved circuit breaker which includes a pair of fixed contacts normally engaged by a contact ring, the contact ring being movable away from the contacts to break the circuit therebetween, the contact ring being selectively actuated by a piston in response to hydraulic pressure thereagainst.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
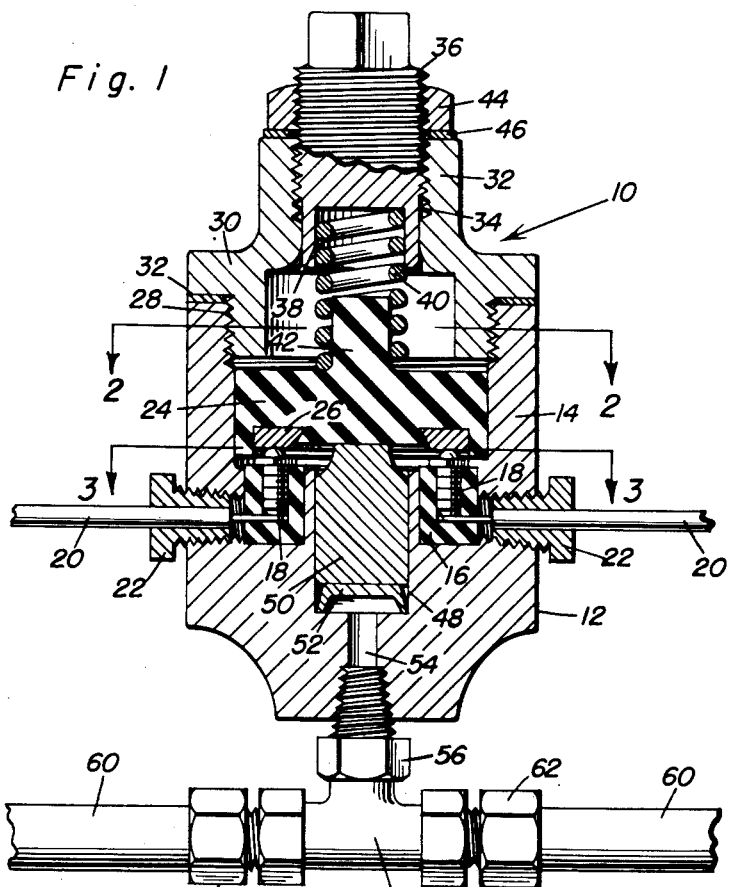
Figure 1 is a vertical sectional view through the improved hydraulic safety switch which is the subject of this invention and shows the same coupled in the hydraulic brake line of a vehicle.
Figure 2:
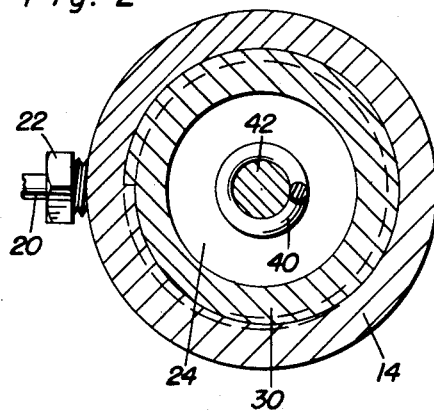
Figure 2 is a transverse horizontal sectional view taken substantially upon the plane indicated by the section line 2—2 of Figure 1.
Figure 3:
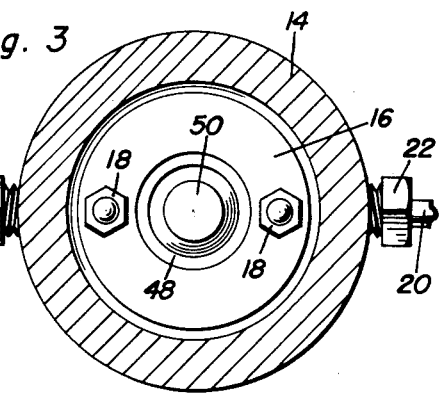
Figure 3 is a transverse horizontal sectional view taken substantially upon the plane indicated by the section line 3—3 of Figure 1.

Referring now to the drawings in detail, it will be seen that there is illustrated the hydraulic safety switch which is the subject of this invention, the hydraulic safety switch being referred to in general by the reference numeral 10. The hydraulic safety switch 10 includes a housing 12 which has a tubular upper portion 14. The housing 12 has mounted in the bottom part of the tubular portion an insulated lower ring 16 which has removably engaged therein a pair of diametrically opposite fixed contacts 18. The fixed contacts 18 have connected thereto adjacent ends of ignition wire 20 whose opposite ends are connected to an ignition switch and a coil of an ignition system, the ignition switch and coil not being shown. The ends of the ignition wire 20 pass through and are retained in the movable bushings 22 threadedly engaged in the sides of the housing 22 in diametrically opposite relation.

Disposed in the upper part of the tubular portion 14 is an enlarged plunger 24 which is formed of an insulation material. The plunger 24 has seated in the lower portion thereof a contact ring 26 which overlies and normally engages the fixed contacts 18 to complete the circuit between the adjacent ends of the ignition wire 20.

The extreme upper part of the tubular portion 14 is internally threaded as at 28 and has removably secured therein a reduced lower portion of a cap 30. The cap 30 is sealed with respect to the housing 12 by a gasket 32.

The upper part of the cap 30 is tubular as at 32 and provided with internal threads 34. Adjustably received in the internal threads 34 is an adjusting fastener 36. The adjusting fastener 36 is provided with a recess 38 in its lower end in which is received the upper end of a coil spring 40. The coil spring 40 has the lower end thereof surrounding an upwardly projecting boss 42 on the plunger 24. It will thus be seen that by utilizing the adjusting fastener 36 the amount of spring pressure on the plunger 24 may be varied.

The adjusting fastener 36 is provided with a lock nut 44 which is removably threaded thereon. The lock nut 44 has disposed between its lower surface and the upper surface of the cap 30 a washer 46.

The lower part of the housing 12 is provided with a cylindrical bore 48 which communicates with the tubular upper portion 14. Disposed within the bore 48 is a piston 50 whose upper end engages the underside of the plunger 24. The piston has abutting against the lower end thereof a sealing cup 52 whose peripheral portion tightly seals against the walls of the cylindrical bore 48.

The housing 12 is provided with a hydraulic fluid passage 54 which opens through the bottom thereof. The hydraulic fluid passage 54 communicates the cylindrical bore 48 with the exterior of the housing 12. Removably threaded in the bottom of the housing 12 is a hollow fitting 56 which communicates a T-shaped fitting 58 with the hydraulic fluid passage 54. The T-shaped fitting 58 is removably secured in the hydraulic brake line 60 by fasteners 62 at opposite ends thereof.

In the operation of the vehicle, when the brakes are applied hydraulic fluid (not shown) within the hydraulic brake line 60 is pressurized. The increase in pressure of the hydraulic brake fluid results in the piston 50 having a tendency to move upwardly. However, the spring 40 is of such a strength whereby the piston 50 is restrained against upward movement during normal application of the hydraulic brakes. However, in the case of an emergency where an operator of a vehicle jams on the brakes and the pressure of the hydraulic fluid in the brake line 60 increases above that normally resulting from application of brakes, the spring 40 may be overcome to permit the piston 50 to move upwardly. The upper movement of the piston 50 results in the upper movement of the contact ring 26 with the result that the circuit in the ignition wire is broken. The breaking of the circuit of the ignition wire 20 results in the temporary loss of ignition of an associated vehicle engine with the result that the compression of the engine is utilized in assisting the brake of the vehicle to stop such a vehicle.

It will be seen that the adjusting fastener 36 may be utilized to adjust the tension of the spring 40 to such a point whereby the safety switch 10 will not be actuated during the normal application of brakes of a vehicle. However, the adjustment of the spring 40 may be such that any desired increase in pressure in the hydraulic brake line 60 will actuate the safety switch 10.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A pressure operative switch comprising a cup-shaped housing having a tubular upper portion and a bottom, a pair of fixed space contacts in the bottom of said tubular portion at diametrically opposite sides thereof adapted to be connected to opposite ends of an ignition wire of an automobile ignition circuit, a contact ring, an insulated plunger in said tubular portion above said ring carrying said ring and movable vertically toward and from said contacts to move said ring into and from bridging engagement with said contacts to close and open said circuit respectively, a pressure operative piston separate from said plunger slidable in said bottom for moving said plunger upwardly from said contacts and adapted to be exposed to hydraulic pressure in an automobile brake line for operation by the pressure in said line, a cap surmounting and threaded into said upper portion and closing said upper portion while limiting upward movement of said plunger, and spring means for moving said plunger towards said contacts comprising a settable member in said cap, and a coil spring interposed between said settable member and said plunger and variably compressible by setting of said member for movement of the plunger by said piston under pressure in the brake line above normal operating pressure.

References Cited in the file of this patent
UNITED STATES PATENTS

| | | |
|---|---|---|
| 1,421,940 | Hamilton | July 4, 1922 |
| 1,727,384 | Thomas | Sept. 10, 1929 |
| 1,807,280 | Carpenter | May 26, 1931 |
| 2,648,733 | Billings | Aug. 11, 1953 |